(12) United States Patent
Vanderwerf

(10) Patent No.: US 9,341,718 B2
(45) Date of Patent: May 17, 2016

(54) METHOD AND SYSTEM FOR PROVIDING INTEGRITY FOR HYBRID ATTITUDE AND TRUE HEADING

(75) Inventor: Kevin D. Vanderwerf, Oro Valley, AZ (US)

(73) Assignee: Honeywell International Inc., Morris Plains, NJ (US)

(*) Notice: Subject to any disclaimer, the term of this patent is extended or adjusted under 35 U.S.C. 154(b) by 230 days.

(21) Appl. No.: 13/606,170

(22) Filed: Sep. 7, 2012

(65) Prior Publication Data

US 2014/0074397 A1 Mar. 13, 2014

(51) Int. Cl.
G01C 21/00 (2006.01)
G01S 19/20 (2010.01)
G01S 19/28 (2010.01)
G01S 19/47 (2010.01)

(52) U.S. Cl.
CPC .......... *G01S 19/20* (2013.01); *G01S 19/28* (2013.01); *G01S 19/47* (2013.01)

(58) Field of Classification Search
USPC .......................................... 701/472
See application file for complete search history.

(56) References Cited

U.S. PATENT DOCUMENTS

| 4,235,758 A | 11/1980 | Dawson |
| 4,235,759 A | 11/1980 | Ohbu |
| 5,512,903 A | 4/1996 | Schmidtke |
| 5,527,003 A * | 6/1996 | Diesel .................... G05D 1/101 244/195 |
| 5,760,737 A * | 6/1998 | Brenner ............... G01C 21/165 342/357.58 |
| 5,786,773 A | 7/1998 | Murphy |
| 5,808,581 A | 9/1998 | Braisted |
| 5,831,576 A | 11/1998 | Sheynblat |
| 5,906,665 A | 5/1999 | Trippe et al. |
| 5,926,132 A * | 7/1999 | Brenner .................... 342/357.29 |
| 5,931,889 A | 8/1999 | Misra |
| 5,969,672 A * | 10/1999 | Brenner .................... 342/357.29 |
| 6,134,484 A | 10/2000 | Geier et al. |

(Continued)

FOREIGN PATENT DOCUMENTS

CA 2379702 10/2003

OTHER PUBLICATIONS

Brown, Grover R., "A Baseline GPS RAIM Scheme and a Note on the Equivalence of Three RAIM Methods", "Journal of the Institute of Navigation", Oct. 1992, pp. 301-316, vol. 39, No. 3, Publisher: Navigation.

(Continued)

*Primary Examiner* — John R Olszewski
*Assistant Examiner* — Jean-Paul Cass
(74) *Attorney, Agent, or Firm* — Fogg & Powers LLC

(57) ABSTRACT

One embodiment is directed towards a method for providing integrity for a hybrid navigation system using a Kalman filter. The method includes determining a main navigation solution for one or more of roll, pitch, platform heading, or true heading for the vehicle using signals from a plurality of GNSS satellites and inertial measurements. Solution separation is used to determine a plurality of sub-solutions for the main navigation solution. The method also includes determining a separation between the main navigation solution and each of the sub-solutions, and a discriminator for each of the separations. The method also includes determining a separation variance between the main navigation solution and each of the sub-solutions, a threshold for detection of a satellite failure based on the separation variances; and a protection limit that bounds error in the main navigation solution based on the threshold.

14 Claims, 3 Drawing Sheets

(56) References Cited

U.S. PATENT DOCUMENTS

| | | |
|---|---|---|
| 6,169,957 B1 | 1/2001 | Arethens |
| 6,204,806 B1 | 3/2001 | Hoech |
| 6,205,377 B1 | 3/2001 | Lupash |
| 6,239,740 B1 | 5/2001 | Collins |
| 6,281,836 B1 | 8/2001 | Lupash |
| 6,317,688 B1 | 11/2001 | Bruckner et al. |
| 6,407,701 B2 | 6/2002 | Ito |
| 6,573,486 B1 * | 6/2003 | Ratkovic et al. ............... 244/3.2 |
| 6,577,952 B2 | 6/2003 | Geier |
| 6,639,549 B2 | 10/2003 | Vanderwerf et al. |
| 6,691,066 B1 | 2/2004 | Brodie |
| 6,711,478 B2 | 3/2004 | Hilb |
| 6,721,657 B2 * | 4/2004 | Ford ..................... G01C 21/165 340/988 |
| 6,757,579 B1 | 6/2004 | Pasadyn |
| 6,760,663 B2 | 7/2004 | Brenner |
| 6,769,663 B2 | 8/2004 | Kelly |
| 6,781,542 B2 | 8/2004 | Hoven |
| 6,798,377 B1 | 9/2004 | Lupash et al. |
| 6,847,893 B1 | 1/2005 | Lupash |
| 6,860,023 B2 | 3/2005 | Manfred |
| 6,861,979 B1 | 3/2005 | Zhodzishsky |
| 6,982,669 B2 | 1/2006 | Coatantiec et al. |
| 7,095,369 B1 | 8/2006 | Clark |
| 7,219,013 B1 | 5/2007 | Young et al. |
| 7,356,445 B2 | 4/2008 | Brodie |
| 7,409,289 B2 | 8/2008 | Coatantiec |
| 7,463,956 B2 | 12/2008 | Einthoven |
| 7,711,482 B2 | 5/2010 | Coatantiec et al. |
| 7,783,425 B1 | 8/2010 | Hwang |
| 7,860,651 B2 | 12/2010 | Morgan |
| 8,014,948 B2 * | 9/2011 | Vanderwerf ................... 701/469 |
| 8,019,539 B2 * | 9/2011 | Vanderwerf ................... 701/471 |
| 8,843,243 B2 * | 9/2014 | Szelewa .................. G01S 19/20 701/1 |
| 2001/0020214 A1 | 9/2001 | Brenner |
| 2002/0116098 A1 | 8/2002 | Maynard |
| 2002/0120400 A1 | 8/2002 | Lin |
| 2003/0117317 A1 | 6/2003 | Vanderwerf |
| 2003/0187575 A1 | 10/2003 | King et al. |
| 2004/0123474 A1 * | 7/2004 | Manfred ................ G01C 17/38 33/352 |
| 2004/0210389 A1 | 10/2004 | Zimmerman |
| 2004/0220733 A1 | 11/2004 | Pasturel et al. |
| 2005/0001762 A1 | 1/2005 | Han et al. |
| 2005/0093739 A1 | 5/2005 | DiLellio |
| 2006/0047413 A1 | 3/2006 | Lopez et al. |
| 2006/0158372 A1 | 7/2006 | Heine et al. |
| 2007/0156338 A1 | 7/2007 | Coatantiec |
| 2008/0015814 A1 | 1/2008 | Harvey, Jr. |
| 2008/0204316 A1 | 8/2008 | Brodie |
| 2009/0079636 A1 | 3/2009 | Riley |
| 2009/0146873 A1 | 6/2009 | Vanderwerf |
| 2009/0150074 A1 | 6/2009 | Vanderwerf |
| 2009/0171583 A1 | 7/2009 | DiEsposti |
| 2009/0182493 A1 * | 7/2009 | McDonald ............. G01S 19/15 701/532 |
| 2009/0182494 A1 | 7/2009 | McDonald et al. |
| 2009/0182495 A1 | 7/2009 | McDonald et al. |
| 2009/0204281 A1 * | 8/2009 | McClure ............. G05D 1/0246 701/25 |
| 2010/0117899 A1 * | 5/2010 | Papadimitratos ....... G01S 19/20 342/357.62 |
| 2010/0204916 A1 | 8/2010 | Garin |
| 2010/0274481 A1 * | 10/2010 | Krishnaswamy .... G01C 21/165 701/532 |
| 2011/0122023 A1 * | 5/2011 | Goudon .................. G01S 19/49 342/357.65 |
| 2013/0069773 A1 * | 3/2013 | Li .......................... B60K 28/02 340/426.1 |
| 2013/0169478 A1 * | 7/2013 | Vourc'h .................. G01S 19/49 342/357.58 |

OTHER PUBLICATIONS

Vanderwerf, "FDE Using Multiple Integrated GPS/Inertial Kalman Filters in the Presence of Temporally and Spatially Correlated IONOSPH", "Proceedings of the Intstitute of Navigation (ION) GPS", Sep. 11, 2001, pp. 2676-2685.

European Patent Office, "Extended European Search Report", "from Foreign Counterpart of U.S. Appl. No. 13/606,170", Dec. 9, 2013, pp. 1-6, Published in: EP.

* cited by examiner

METHOD AND SYSTEM FOR PROVIDING INTEGRITY FOR HYBRID ATTITUDE AND TRUE HEADING

BACKGROUND

Attitude (roll, pitch, and platform heading) and true heading navigation solutions are used to aid the navigation of aircrafts, missiles, ships and tankers, automobiles, precision alignment for oil drills, and even high performance aerobatic trainers. For aviation applications, the Federal Aviation Administration (FAA) provides guidelines for attitude and true heading reference systems (AHRS). AHRS systems contain inertial sensors (e.g., gyroscopes and accelerometers) that measure angular rotation and linear acceleration. These AHRS systems are sometimes aided with GPS receiver measurements to create a hybrid GPS/inertial system that can produce accurate navigation solutions for position, velocity, attitude, and true heading. Such navigation solutions can be provided to Flight Management Systems, primary displays, forward-looking IR cameras, ground flight control, antenna stabilization, radar and other navigation systems to guide a pilot, driver, or drill head operator.

SUMMARY

One embodiment is directed towards a method for providing integrity for a hybrid navigation system using a Kalman filter. The method includes receiving signals from a plurality of global navigation satellite system (GNSS) satellites at a vehicle and obtaining inertial measurements from one or more inertial sensors on the vehicle. The method also includes determining a main navigation solution for one or more of roll, pitch, platform heading, or true heading for the vehicle using data from the signals from a plurality of GNSS satellites and the inertial measurements. The method also includes using solution separation to determine a plurality of sub-solutions for the main navigation solution, determining a separation between the main navigation solution and each of the sub-solutions, and determining a discriminator for each of the separations. If a discriminator is greater than the threshold determining which of the GNSS satellites is at fault and excluding the GNSS satellite at fault. The method also includes determining a separation variance between the main navigation solution and each of the sub-solutions, determining a threshold for detection of a satellite failure based on the separation variances and an allowable false alert rate; and determining a protection limit that bounds error in the main navigation solution based on the threshold and an allowable missed detection probability.

DRAWINGS

The following exemplary figures are intended to aid the understanding of the written description of the exemplary embodiments and should not be considered limiting in scope.

Figure 1:
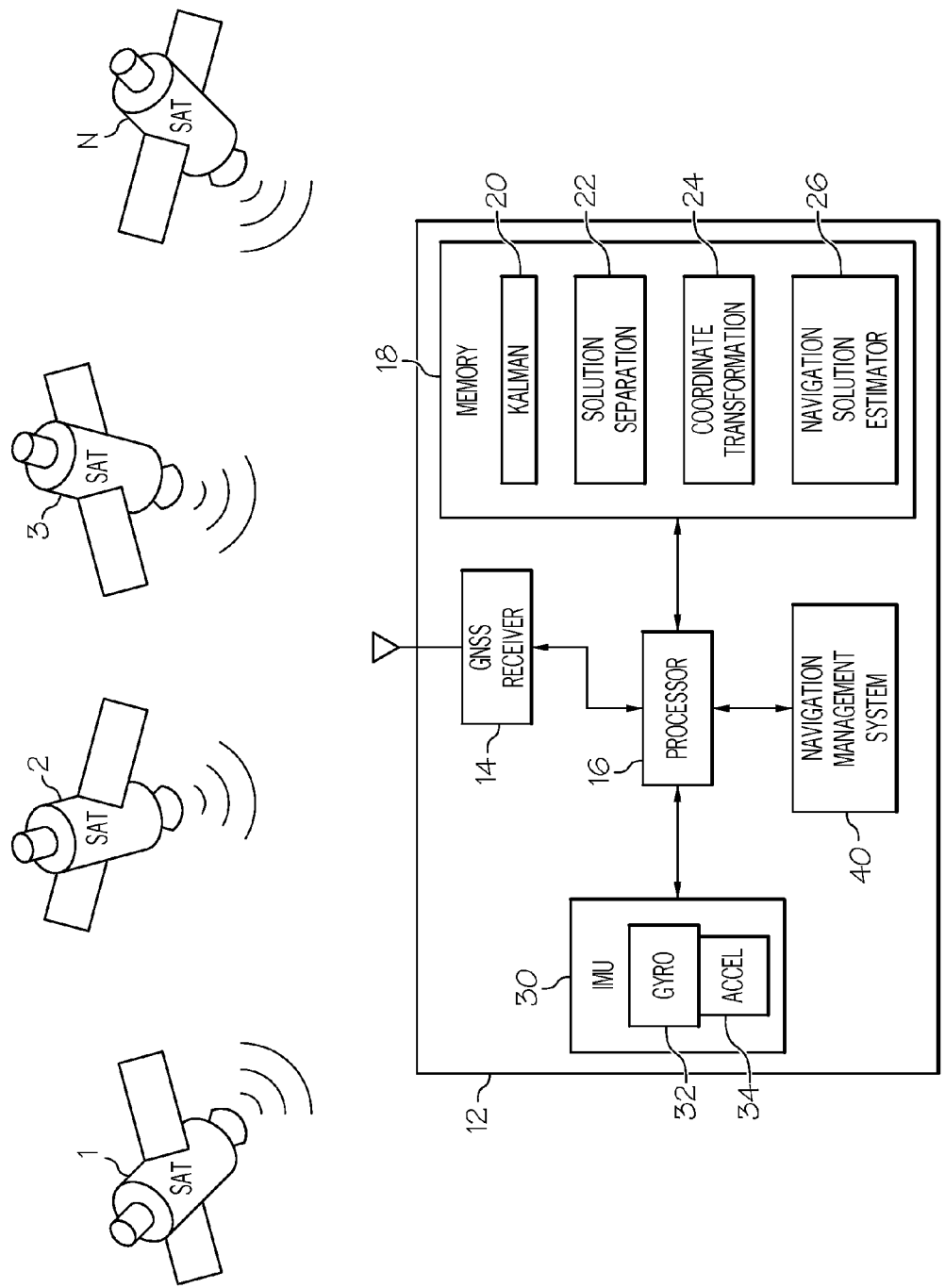
FIG. 1 is an exemplary embodiment of system including a vehicle with a hybrid navigation system configured to provide integrity on navigation solutions for hybrid attitude and/or true heading.

In accordance with common practice, the various displayed features are not necessarily drawn to scale but are drawn to emphasize specific features relevant to the exemplary embodiments.

DETAILED DESCRIPTION

In the following description, reference is made to the accompanying drawings and specific illustrative embodiments. However, it is to be understood that other embodiments may be utilized and that logical, software, mechanical, and electrical changes may be made. Furthermore, the method presented in the drawing figures and the specification is not to be construed as limiting the order in which the individual steps may be performed. The following description is, therefore, not to be taken in a limiting sense.

The embodiments described herein provide integrity on navigation solutions for roll, pitch, platform heading, (collectively referred to as "attitude") and/or true heading. The integrity is provided using Kalman filters and solution separation techniques. In some embodiments, a navigation solution for roll, pitch, platform heading, and/or true heading is determined by estimating and then subtracting off the error from different sources from an estimated navigation solution for roll, pitch, platform heading, and/or true heading. Kalman filter techniques are used to estimate the errors.

Sources of errors in determining a navigation solution for attitude and/or true heading include inertial sensor misalignment, non-orthogonality of the instruments' input axes, sensor biases, scale factor errors, and sensor random noise. One source of error that propagates into the estimated navigation solution comes from the GPS/GNSS (Global Navigation Satellite System) measurements. If this error grows in a certain way, the Kalman filter can misinterpret the resulting measurement residual error as an inertial error resulting in an attitude and/or true heading error. There are also other sources of errors related to GPS/GNSS, such as the error transforming the hybrid position into the Earth frame for computing GPS (position, velocity, pseudo-range, or delta-range) measurement residual. As another example, the vectors and error matrices are transformed from the instrument-body frame of reference to the local-level or Earth frames, which may also entail errors. Coordinate system transformations include errors from the position measurements that are determined from using a plurality of satellites. A satellite failure can also corrupt a navigation solution for hybrid attitude and/or true heading. If there are failures in a particular satellite, then the estimated errors will not be correct. For GPS/GNSS satellite measurements, the satellite failures known as "ranging errors" are significantly larger than normally expected errors due to ionospheric delay or interference, ephemeris errors, clock errors, multipath distortion, or receiver noise. Sources of errors related to accelerometer and gyroscope measurements can also be included in the Kalman filter.

Although the embodiments are not limited to aviation, for the sake of uniformity, the aeronautical usage of the words "attitude" and "true heading" is invoked in this patent application. Although the GPS version of GNSS is referred to herein, it should be understood that the described embodiments can be used with other GNSS.

FIG. 1 depicts one exemplary embodiment of a vehicle 12 with one or more inertial measurement units (IMUs) 30 including one or more gyroscopes 32 and accelerometers 34. Vehicle 12 also includes a GNSS receiver 14 that receives signals from a number of satellites 1-N. Vehicle 12 further includes one or more processors 16 coupled to one or more memory units 18 that store instructions (e.g., software) as well as data received from the GNSS receiver 14 and IMUs 30. The instructions, when executed on the processor(s) 16, are configured to cause the processor(s) 16 to determine a hybrid navigation solution for roll, pitch, platform heading, and/or true heading based on the data from the GNSS receiver 14 and IMUs 30. The instructions on the memory 18 can include a Kalman filter module 20, a solution separator module 22, a coordinate transform module 24, and a navigation solution estimation module 26 that are configured to implement their respective functions on the processor 16. The Kalman filter 20 and solution separator 22 interface with a coordinate transformation module 24 to transform the calculations of the Kalman filter 20 and the solution separator 22. The coordinate-transformed results go to a navigation solution estimator 26 that subtracts off the estimated errors computed by the Kalman filter 20. The results of the estimator 26 output to a navigation management system 40 that includes another processor to oversee navigation and provide commands to various units, for example, the sensors 30, GNSS receiver 14, and processor 16. For an aircraft, the navigation management system 40 could be a Flight Management System that communicates with a pilot and a ground control station through display monitors or printers. In another embodiment, processor 16 and the navigation management system 40 may be combined in a single unit. The navigation management system 40 can be implemented using any suitable processor and display technology such as, but not limited to, printers, computer screens, various CRT, active and passive matrix LCD, and plasma display units. The processor 16 and the processor in the navigation management system 40 may include any suitable processing device such as a digital signal processor (DSP), central processing unit (CPU), micro-controller, or arithmetic logic unit. Memory 18 may comprise any suitable storage entity such as a flash drive, magnetic-disk drive, RAM (e.g., DRAM), ROM, PROM, or CD/DVD/Blu-ray, optical storage or optoelectronics circuits.

Figure 2:
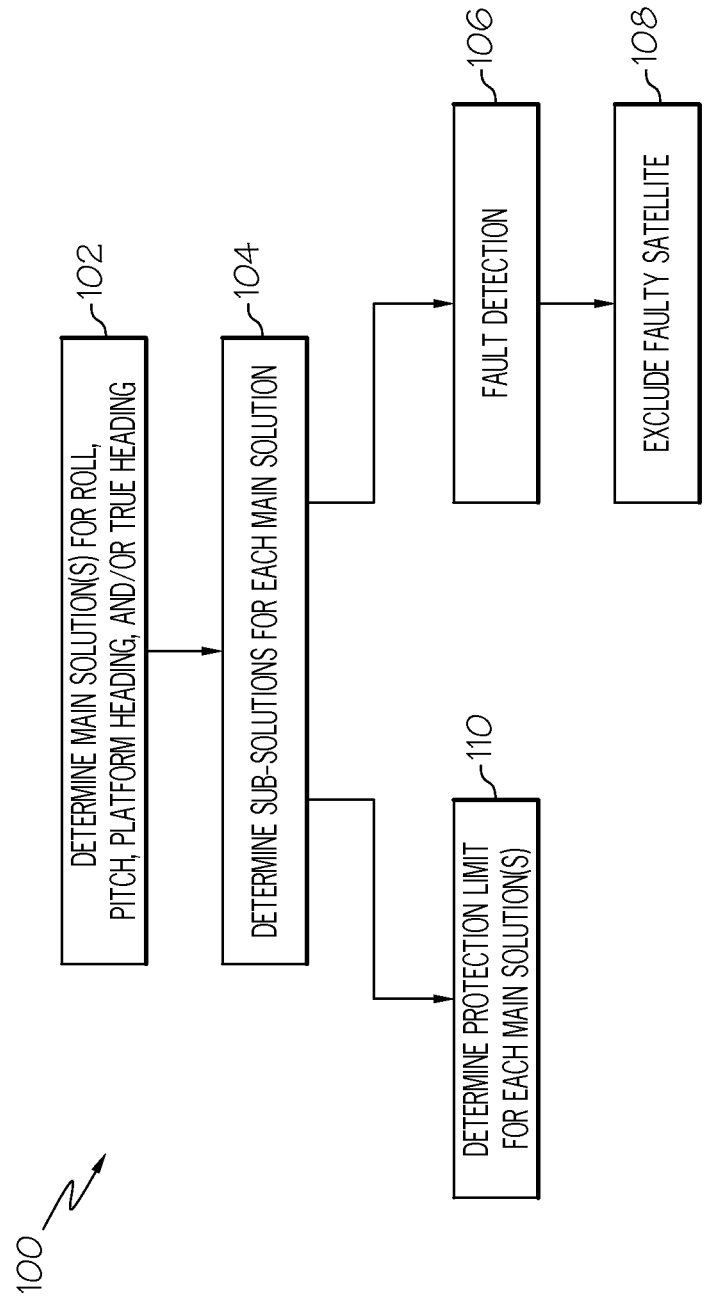
FIG. 2 is a flowchart of one embodiment of the method for providing integrity on navigation solutions for hybrid attitude and/or true heading.

FIG. 2 illustrates one embodiment of a method 100 for providing integrity on a navigation solution for roll, pitch, platform heading, and/or true heading. At block 102, a main navigation solution is determined with a Kalman filter 20. The Kalman filter 20 receives measurement data from the IMUs 30 and the GNSS receiver 14. The Kalman filter 20 fuses the data and calculates the main navigation solution therefrom. The Kalman filter 20 can implement any suitable Kalman filtering technique such as a basic feed-forward Kalman filter, an extended-Kalman filter, or a hybrid technique. In the discussions below, the extended-Kalman filter is used where the error models are linearized about the most recent estimate of the error state. For the extended-Kalman filter, the differential "δ," or the changes in errors in the equations below refer to a delta with respect to the point about which the models are linearized.

The IMUs 30 can be configured to output inertial measurements in the reference frame of the body of the aircraft (i.e., the longitudinal and lateral axis of the aircraft), also referred to herein as the "aircraft body frame" or simply "body frame". The body frame coordinate system is a reference frame with the positive x-axis directed along the fuselage axis towards the nose, the positive y-axis directed along the right wing, and the positive z-axis directed towards the bottom of the aircraft. However, for purposes of navigating an aircraft, it is desirable to know the aircraft attitude with respect to the horizon (or horizontal plane). Accordingly, the inertial measurements in the body frame can be transformed to the "local-level" frame (also referred to as the "navigation" or "horizontal" frame).

As implied by the name, the local-level frame is level (i.e., horizontal) at the given origin location with respect to the Earth. Accordingly, the local-level frame has its positive x and y axes in the horizontal (i.e., tangent) plane, and its positive z-axis pointed down along the geodetic vertical. The azimuth orientation of the x-axis is arbitrary with the y axis orthogonal to both x and z according to the right-hand rule. The geographic (or north, east, down) coordinate system is a special case of the local-level frame where the z-axis is pointed down along the geodetic vertical, but the positive x-axis is directed toward true north and the positive y-axis is directed East.

Finally, there is also the "Earth" coordinate reference frame, which is an Earth-centered Earth-fixed (or ECEF) frame to which satellite positions are referenced. The origin of the Earth reference frame is taken to be at the center of the Earth with the x and y axes in the equatorial plane, with the x-axis intersecting the Greenwich meridian and the z-axis intersecting the north pole. In this disclosure, "B" stands for the body frame, "L" stands for the local level frame, and "E" stands for the Earth frame.

Before turning to the details, it is useful to be more specific about "attitude" and "true heading." An aircraft example may be used to facilitate the description. The attitude of an aircraft is the rotation of the aircraft as determined by the relationship between its body frame and the local-level frame. The angular relationship between the body frame and the local-level frame can be described by the attitude which includes roll, pitch, and platform heading angles. Platform heading is the angle in azimuth between the local-level frame "x" axis and the body frame "x" (longitudinal) axis. Pitch is the elevation angle of the body frame "x" axis relative to the horizontal plane (i.e., the plane normal to the z-axis of the local-level frame). Roll is the angle about the body frame "x" axis that the body frame "y" axis makes relative to the horizontal plane.

A main navigation solution for true heading can also be calculated. In contrast to platform heading which is taken with respect to the local-level frame "x" axis, "true heading" is the direction in azimuth which the body frame "x" axis points with respect to true north, i.e., the north pole. True heading is equal to the platform heading plus a wander angle which is the directional difference in azimuth between the local-level "x" axis and true north.

The main navigation solution for roll, pitch, platform heading, and/or true heading provided by the Kalman filter 20 corresponds to error states in a navigation error state vector maintained by the Kalman filter 20. In an example, a 9×1 navigation error state vector Δx is maintained, however, in other examples, the navigation error state vector can have more or fewer states. The 9×1 navigation error state vector is as follows:

$$\Delta x = \begin{bmatrix} \tilde{\psi} \\ \delta \tilde{v} \\ \delta r \end{bmatrix}$$

where $\tilde{\psi} = \epsilon - \gamma =$ the 3×1 "psi-angle" attitude error vector
$\delta \tilde{v} = \delta v + \epsilon \times v =$ the 3×1 velocity error vector
$\delta r =$ the 3×1 position error vector In this example, the "psi-angle" attitude error vector is defined in terms of two other angular error vectors $\epsilon$ and $\gamma$. In other examples, the attitude error vector can merely be $\gamma$ itself. The use of the "psi-angle" attitude error vector somewhat simplifies the navigation error equations. $\epsilon$ is the angular error of the local-level (L) frame relative to the L-to-E frame transformation whose x and y components represent the angular position error, r is the radius vector is from the Earth to the aircraft, and r is the radial distance from the Earth's center to the aircraft, and v is the velocity vector. The x and y components of $\epsilon$ are related to the horizontal position error components. In particular, $\delta_x = \epsilon r_y/r$, and $\epsilon_y = -\delta r_x/r$.

The vertical component represents an azimuth error and is arbitrary (since the local-level frame azimuth orientation is arbitrary) and is often assumed to be zero. The variable $\gamma$ is the angular error of the local-level (L) frame relative to the B-to-L frame transformation. Based on the foregoing definition for $\psi$tilde, $\gamma$ can be taken as the $\epsilon$—($\psi$tilde), or the angular position error minus the psi-angle attitude error.

There are various sources of errors that propagate to a best estimate of roll angle $\phi$, pitch angle $\theta$, platform heading $\psi_c$, and true heading angle $\psi$. The errors in the roll, pitch, and platform heading angles are a direct result of the error in the body-to-local-level frame transformation. The error in the true heading is equal to the sum of the errors in the platform heading and wander angle. The error in the wander angle is a direct result of the error in the local-level to earth frame transformation.

To calculate the angular error in the body frame to local-level frame transformation, a matric C representing the transformation can be used. In this example, $[v^L] = [C_B^L][v^B]$, where $v^B$ is a vector in the body frame, $v^L$ is the same vector expressed in the local-level frame, and Cl is the rotation transformation matrix from the body frame to the local-level frame.

The transformation $C_B^L$ is a 3×3 matrix containing nine direction cosine elements. It can be expressed as the product of three rotation matrices (three rotations, also known as Euler angles), each of which specifies a rotation about the body frame. In shorthand: $C_B^L = [\phi][\theta][\psi]$, where $\phi$ represents a rotation about the fuselage x-axis (roll angle); $\theta$ represents a rotation about the wing y-axis (pitch angle); and $\psi$ represents a rotation about the vertical z axis (platform heading angle).

Using this notation, the error in the body frame to local-level frame transformation is:

$$\delta C_B^L = -\{\gamma\}C_B^L \equiv \begin{bmatrix} 0 & \gamma_z & -\gamma_y \\ -\gamma_z & 0 & \gamma_x \\ \gamma_y & -\gamma_x & 0 \end{bmatrix} C_B^L$$

Nu carrying out the matrix multiplications describing the Euler sequence, $C_B^L$ can be represented in terms of Euler Angles where $$C_B^L = \begin{bmatrix} c_{11} & c_{12} & c_{13} \\ c_{21} & c_{22} & c_{23} \\ c_{31} & c_{32} & c_{33} \end{bmatrix}$$

and the elements of $C_B^L$ are:

$c_{11} = \cos\theta \cos\psi_c$ $c_{12} = -\cos\phi \sin\psi_c + \sin\phi \sin\theta \cos\psi_c$ $c_{13} = \sin\phi \sin\psi_c + \cos\phi \sin\theta \cos\psi_c$ $c_{21} = \cos\theta \sin\psi_c$ $c_{22} = \cos\phi \cos\psi_c + \sin\phi \sin\theta \sin\psi_c$ $c_{23} = -\sin\phi \cos\psi_c + \cos\phi \sin\theta \sin\psi_c$ $c_{31} = -\sin\theta$ $c_{32} = \sin\phi \cos\theta$ $C_{33} = \cos\phi \cos\theta$ Based on these equations, the roll, pitch, and platform heading angles in the local-level frame can be expressed in terms of the transformation matrix elements as follows.

$$\phi = \arctan\left(\frac{c_{32}}{c_{33}}\right) - 180° \le \phi \le 180°$$

$$\theta = \arctan\left(\frac{-c_{31}}{\sqrt{1-c_{31}^2}}\right) - 90° \le \theta \le 90°$$

$$\psi_c = \arctan\left(\frac{c_{21}}{c_{11}}\right) - 180° \le \psi_c \le 180°$$

In other embodiments, another set of equations may be used, and the following embodiment is one possible set that simplifies the computations for the error equations.

Perturbing the equations for roll, pitch, and platform heading and substituting for the resulting perturbed coordinate transformation elements in terms of the epsilon and gamma vector elements, we get the following for the roll, pitch, and platform heading errors.

$$\delta\phi = -\frac{\gamma_x \cos\psi_c + \gamma_y \sin\psi_c}{\cos\theta}$$

$$\delta\theta = -\gamma_y \cos\psi_c + \gamma_x \sin\psi_c$$

$$\delta\psi_c = -\gamma_z - (\gamma_x \cos\psi_c + \gamma_y \sin\psi_c)\tan\theta$$

Similar to the transformation between the body frame and the local-level frame, a matrix $C_L^E$ can be used representing the transformation between the local-level frame and the Earth frame. This coordinate transformation takes into account longitude and latitude Earth coordinates, along with the wander angle (i.e., the azimuth angle between true north and the x axis of the local-level frame). In this example, $[v^E] = [C_L^E][v^L]$, where $v^E$ is a vector in the Earth frame, $v^L$ is the same vector expressed in the local-level frame, and $C_L^E$ is the rotation transformation matrix from the local-level frame to the Earth frame.

Using this notation, the error in the body frame to local-level frame transformation is:

$$\delta C_L^E = C_L^E \{\varepsilon\} \equiv C_L^E \begin{bmatrix} 0 & -\varepsilon_z & \varepsilon_y \\ \varepsilon_z & 0 & -\varepsilon_x \\ -\varepsilon_y & \varepsilon_x & 0 \end{bmatrix}$$

$\varepsilon_x = \frac{\delta r_y}{y}, \varepsilon_y = -\frac{\delta r_x}{r}, r \equiv$ radial distance from earth's center to user Represented in terms of Euler angles, $$C_L^E = \begin{bmatrix} d_{11} & d_{12} & d_{13} \\ d_{21} & d_{22} & d_{23} \\ d_{31} & d_{32} & d_{33} \end{bmatrix}$$

and the entries for $C_L^E$ are:

$d_{11} = -\sin \Lambda \sin \alpha - \cos \Lambda \sin \lambda \cos \alpha$ $d_{12} = -\sin \Lambda \cos \alpha + \cos \Lambda \sin \lambda \sin \alpha$ $d_{13} = -\cos \Lambda \cos \lambda$ $d_{21} = \cos \Lambda \sin \alpha - \sin \Lambda \sin \lambda \cos \alpha$ $d_{22} = \cos \Lambda \cos \alpha + \sin \Lambda \sin \lambda \sin \alpha$ $d_{23} = -\sin \Lambda \cos \lambda$ $d_{31} = \cos \lambda \cos \alpha$ $d_{32} = -\cos \lambda \sin \alpha$ $d_{33} = -\sin \lambda$ Where $\lambda$ is the latitude, is $\Lambda$ the longitude and $\alpha$ is the wander angle. Based on these equations, the latitude $\lambda$, longitude $\Lambda$, and wander angle $\alpha$ can be expressed in terms of the coordinate transformation matrix elements as follows.

$$\lambda = \arctan\left(\frac{-d_{33}}{\sqrt{1-d_{33}^2}}\right) - 90° \leq \lambda \leq 90°$$

$$\Lambda = \arctan\left(\frac{-d_{23}}{-d_{13}}\right) - 180° \leq \Lambda \leq 180°$$

$$\alpha = \arctan\left(\frac{-d_{32}}{d_{31}}\right) - 180° \leq \alpha \leq 180°$$

As mentioned above, a navigation solution for true heading can also be calculated. The true heading angle is the sum of the platform heading angle and the wander angle, as follows. In other embodiments, another set of equations may be used, and the following embodiment is one possible set that simplifies the computations for the error equations.

Wander angle error can be found by perturbing the equations for roll, pitch, and platform heading and substituting for the resulting perturbed coordinate transformation elements in terms of the epsilon vector elements, resulting in the following $\delta\alpha = \epsilon_z = (\epsilon_x \cos \alpha - \epsilon_y \sin \alpha) \tan \lambda$, where $\lambda$=Latitude.

The true heading error can be calculated by adding the wander angle error into the platform heading error equation above yielding, $$\delta\psi = \delta\psi_c + \delta\alpha$$
$$= [\epsilon_z + (\epsilon_x \cos\alpha - \epsilon_y \sin\alpha)\tan\lambda] + [-\gamma_z - (\gamma_x \cos\psi_c + \gamma_y \sin\psi_c)\tan\theta]$$
$$= (\epsilon_z - \gamma_z) - (\gamma_x \cos\psi_c + \gamma_y \sin\psi_c)\tan\theta + (\epsilon_x \cos\alpha - \epsilon_y \sin\alpha)\tan\lambda$$

Once the roll, pitch, platform heading, and true heading errors are developed, they can be related to the error states of navigation state vector by using:

$\gamma = \epsilon - \tilde{\psi}, \epsilon_x = \frac{\delta r_y}{r}, \epsilon_y = -\frac{\delta r_x}{r}$.

Making these substitutions, we obtain the following pitch, roll, and true heading errors in terms of the Kalman filter states:

$$\delta\phi = \frac{-\left(\frac{\delta r_y}{r} - \tilde{\psi}_x\right)\cos\psi_c + \left(\frac{\delta r_x}{r} + \tilde{\psi}_y\right)\sin\psi_c}{\cos\theta}$$

$$\delta\theta = \left(\frac{\delta r_x}{r} + \tilde{\psi}_y\right)\cos\psi_c + \left(\frac{\delta r_y}{r} - \tilde{\psi}_x\right)\sin\psi_c$$

$$\delta\psi = \tilde{\psi}_z + \left[-\left(\frac{\delta r_y}{r} - \tilde{\psi}_x\right)\cos\psi_c + \left(\frac{\delta r_x}{r} + \tilde{\psi}_y\right)\sin\psi_c\right]\tan\theta +$$
$$\left(\frac{\delta r_y}{r}\cos\alpha + \frac{\delta r_x}{r}\sin\alpha\right)\tan\lambda$$

In vector form matching with the navigation state vector, the above equations form error mapping vectors for roll, pitch, and true heading as follows:

$\delta\theta = c_\phi^T \Delta x, \delta\theta = c_\theta^T \Delta x, \delta\psi = c_\psi^T \Delta x,$ $$c_\phi = \begin{bmatrix} \frac{\cos\psi_c}{\cos\theta} \\ \frac{\cos\psi_c}{\cos\theta} \\ 0 \\ 0 \\ 0 \\ 0 \\ \frac{\sin\psi_c}{r\cos\theta} \\ -\frac{\cos\psi_c}{r\cos\theta} \\ 0 \end{bmatrix} \quad c_\theta = \begin{bmatrix} -\sin\psi_c \\ \cos\psi_c \\ 0 \\ 0 \\ 0 \\ \frac{\cos\psi_c}{r} \\ \frac{\sin\psi_c}{r} \\ 0 \end{bmatrix} \quad c_\psi = \begin{bmatrix} \cos\psi_c \tan\theta \\ \sin\psi_c \tan\theta \\ 1 \\ 0 \\ 0 \\ 0 \\ \frac{\sin\psi_c \tan\theta + \sin\alpha\tan\lambda}{r} \\ \frac{-\cos\psi_c \tan\theta + \cos\alpha\tan\lambda}{r} \\ 0 \end{bmatrix}$$

An error mapping vector for platform heading can also be used. The error mapping vectors for roll, pitch, platform heading, and true heading can be used, as described below, to extract the portion of the errors in the state vector of the Kalman filter that affect each of the respective measurements. That is, the error mapping vector for roll can be used to determine the portion of the error in the error state vector that affects the main navigation solution for roll. The error mapping vectors for pitch, platform heading, and true heading can be similarly used for the main navigation solution for pitch, platform heading, and true heading respectively.

At block 104, sub-solutions are maintained by N Kalman filters, each of which incorporates measurements from a different combination of N−1 satellites, where the main navigation solution incorporates measurements from all N satellites. That is, sub-filter n excludes measurements from satellite n. If a satellite has large errors, it will drive one or more of the sub-solutions away from the main solution maintained by the primary Kalman filter. More specifically, there are solution differences (also referred to herein as "separations") between the main navigation solution (also referred to herein as "main solution") of the primary Kalman filter and each sub-solution of each sub-filter n. In examples, where main navigation solutions for more than one of roll, pitch, platform heading, and true heading are used, a plurality of sub-solutions are determined for each main solution. That is, a plurality of sub-solutions and a main solution are determined for each of roll, pitch, platform heading, and true heading.

To calculate a protection limit for a navigation solution for roll, pitch, platform heading, and/or true heading, an estimation error variance for the main solution and each sub-solution of the respective variable (roll, pitch, platform heading, and/or true heading) is calculated. The estimation error variance for a solution is based on the estimation error which, for true heading, is:

$$\delta\hat{\psi} - \delta\psi = (c_\psi^T \Delta\hat{x} - c_\psi^T \Delta x) = c_\psi^T(\Delta\hat{x} - \Delta x) = c_\psi^T \delta x.$$

The estimation error variance (i.e., mean square value) for true heading is $$\sigma_\psi^2 = E[(\delta\hat{\psi} - \delta\psi)(\delta\hat{\psi} - \delta\psi)^T]$$
$$= c_\psi^T E[\delta x \delta x^T] c_\psi$$
$$= c_\psi^T P c_\psi$$

where $x^T$ is the transpose of $\Delta x$, and "E" stands for the expected value of the item in the brackets. P is the navigation error state covariance matrix in the local level reference frame for the x, y, and z components of the true heading angle. And, c is the transformation vectors given above, or its transposed version, $c^T$.

The estimation error variance is then calculated for the main solution and each sub-solution as shown below. The main solution may be designated as 00, and the n-th sub-solution may be designated as 0n. The error variance of the main solution and the error variance of the n-th sub-solution for true heading are as follows.

$$\sigma_{\delta\psi_{00}}^2 = c_\psi^T P_{00} c_\psi$$

$$\sigma_{\delta\psi_{0n}}^2 = c_\psi^T P_{0n} c_\psi$$

The estimation error variance for roll, pitch, and platform heading can be determined in a similar manner. The estimation error variances for roll and pitch for the main solution and each sub-solution are $$\sigma_{\delta\phi_{00}}^2 = c_\phi^T P_{00} c_\phi$$

$$\sigma_{\delta\theta_{00}}^2 = c_\theta^T P_{00} c_\theta$$

$$\sigma_{\delta\phi_{0n}}^2 = c_\phi^T P_{0n} c_\phi$$

$$\sigma_{\delta\theta_{0n}}^2 = c_\theta^T P_{0n} c_\theta$$

The solution differences ("separations") are calculated for the parameters derived from the main solution 00 and each sub-solution n for true heading as $$d\psi_{0n} = \hat{\psi}_{00} - \hat{\psi}_{0n}$$
$$= \delta\hat{\psi}_{00} - \delta\hat{\psi}_{0n}$$

By subtracting the error from each heading error estimate, an equivalent expression for the separation for true heading can be developed as:

$$d\psi_{0n} - (\delta\hat{\psi}_{00} - \delta\psi) - (\delta\hat{\psi}_{0n} - \delta\psi) = c_\psi^T(\Delta\hat{x}_{00} - \Delta x) - c_\psi^T(\Delta\hat{x}_{0n} - \Delta x)$$
$$= c_\psi^T[(\Delta\hat{x}_{00} - \Delta x) - (\Delta\hat{x}_{0n} - \Delta x)]$$
$$= c_\psi^T(\delta\hat{x}_{00} - \delta\hat{x}_{0n})$$

The variance of the separation between the main solution 00 and the sub-solution n for true heading is:

$$\sigma_{d\psi_{0n}}^2 = E[c_\psi^T(\delta x_{00} - \delta x_{0n})(\delta x_{00} - \delta x_{0n})^T c_\psi]$$
$$= c_\psi^T E[\delta x_{00}(\delta x_{00})^T] c_\psi - c_\psi^T E[\delta x_{00}(\delta x_{0n})^T] c_\psi - c_\psi^T E[\delta x_{0n}(\delta x_{00})^T] c_\psi +$$
$$c_\psi^T E[\delta x_{0n}(\delta x_{0n})^T] c_\psi$$
$$= c_\psi^T[P_{00} - P_{0n}^{cross} - (P_{0n}^{cross})^T + P_{0n}] c_\psi$$

It can be shown that $$P_{0n}^{cross} = P_{00}.$$

Substituting this into the above results in $$\sigma_{d\psi_{0n}}^2 = c_\psi^T(P_{0n} - P_{00}) c_\psi,$$

which can be used as the calculation for the variance of the separation between the main solution 00 and each sub-solution 0n. Similarly, the separation variances for roll and pitch are $$\sigma_{d\phi_{0n}}^2 = c_\phi^T(P_{0n} - P_{00}) c_\phi$$

$$\sigma_{d\theta_{0n}}^2 = c_\theta^T(P_{0n} - P_{00}) c_\theta$$

In block 106, these variances are used to determine if a fault has occurred. A fault occurs when the separation between a main solution and one (or more) of its corresponding sub-solutions exceeds a threshold that is based on the expected statistical separation and the allowable false alert rate. For each navigation solution (roll, pitch, platform heading, and true heading) there are threshold settings. The detectable failure level does not depend on the failure type.

In one embodiment, the threshold is taken to be the product of the standard deviation of the heading separation and a multiplier K. In short-hand, the discriminator is the difference ("separation") between the main solution and the n-th sub-solution, which for true heading is written as:

$$|d\hat{\psi}_{0n}| = |\hat{\psi}_{00} - \hat{\psi}_{0n}| > D_{\psi_{0n}},$$

where the threshold is defined as:

$$D_{\psi_{0n}} = K_{fa} \sigma_{d\psi_{0n}},$$

The multiplier, $K_{fa}$, is set to yield an allowable false alert rate based on a Gaussian distribution.

Similarly, a satellite ranging fault for the navigation solutions for roll and pitch is detected when $$|d\phi_{0n}| \equiv |\hat{\phi}_{00} - \hat{\phi}_{0n}| > D_{\phi_{0n}}, \text{ or}$$
$$|d\theta_{0n}| \equiv |\hat{\theta}_{00} - \hat{\theta}_{0n}| > D_{\theta_{0n}}$$

or where $$D_{\phi_{0n}} = K_{fa} \sigma_{d\phi_{0n}}$$

$$D_{\theta_{0n}} = K_{fa} \sigma_{d\theta_{0n}}.$$

Figure 3:
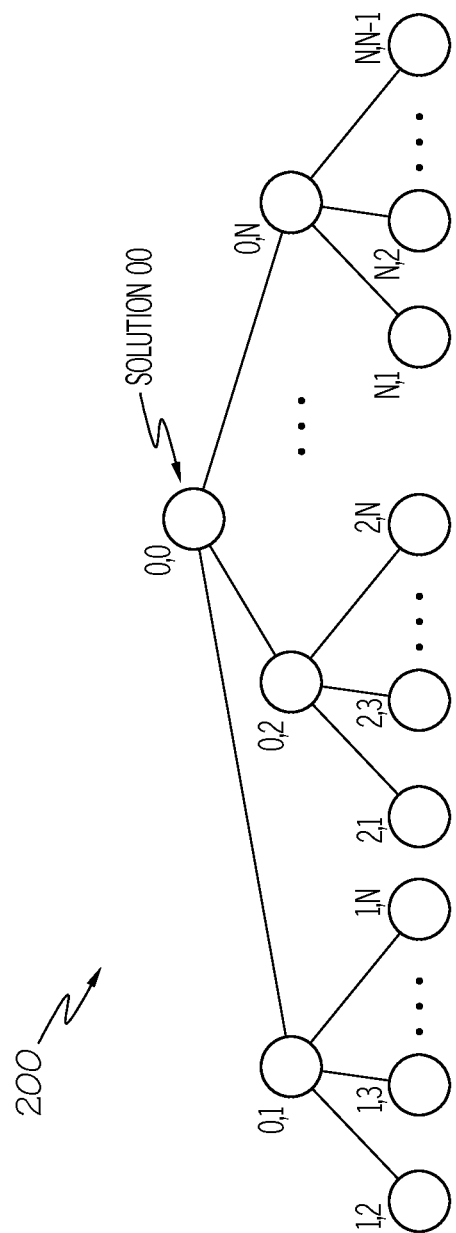
FIG. 3 is an exemplary embodiment of the hierarchy of solutions used to provide integrity on navigation solutions for hybrid attitude and/or true heading.

At block 108, if a fault is detected, the faulty satellite can be excluded and the navigation solution (including attitude and/or true heading) and protection limits can be maintained by using a set of N−1 sub-sub-filters m for each sub-filter n. Each sub-sub-filter m excludes a different satellite in addition to the one excluded by its parent sub-filter. The general hierarchy of Kalman filter solutions 200 for any one of the solutions (roll, pitch, platform heading, or true heading) is shown in FIG. 3. Once detection of a faulty satellite occurs, the separation between each sub-sub-filter m and its parent sub-filter n is also compared to a detection threshold, for roll, for example. If the separation between sub-filter n and any of its sub-sub-filters m exceeds the detection threshold, then satellite n cannot be the faulty satellite. If one and only one sub-filter p is found for which the separation between it and all of its sub-sub-filters q under the detection threshold, then satellite p is the faulty satellite.

At block 110, protection limits for each main solution (e.g., roll, pitch, platform heading, and/or true heading) are determined. It can be useful to generate a protection limit (an error bound) so that a user who receives these results has a quantitative indication as to the maximum error that meets the required integrity. Separate protection limits are calculated for roll, pitch, platform heading, and/or true heading.

A protection limit can be provided as an output for a navigation solution based on the computed threshold $D_{\psi 0n}$ and the predicted error in each sub-filter solution. A true heading protection level (THPL) is taken to be the worst case (i.e., the maximum value) of $D_{\psi 0n}$ and the product $(K_{md}\sigma_{\delta\psi n})$ for all N sub-solutions and the failure free THPL whichever is larger. That is, $$THPL = \max(THPL_{H0}, THPL_{H1})$$

$$THPL_{H0} = K_{ff}\sigma_{\delta\psi 00}$$

$$THPL_{H1} = \max(D_{\psi 0n} + K_{md}\sigma_{\delta\psi 0n}), n=1, N$$

where the fault-free multiplier $K_{ff}$ is set to yield the overall allowable integrity failure rate and $K_{md}$ is set to yield the allowable missed detection probability.

Similarly, protection levels for roll and pitch are:

$$RPL = \max(RPL_{H0}, RPL_{H1})$$

$$RPL_{H0} = K_{ff}\sigma_{\delta\phi 00}, RPL_{H1} = \max(D_{\phi 0n} + K_{md}\sigma_{\delta\phi 0n}), n=1, N$$

$$PPL = \max(PPL_{H0}, PPL_{H1})$$

$$PPL_{H0} = K_{ff}\sigma_{\delta\theta 00}, PPL_{H1} = \max(D_{\theta 0n} + k_{md}\sigma_{\delta\theta 0n}), n=1, N.$$

Although the above description focused on one GNSS antenna and receiver on an aircraft, in an alternative embodiment, if an aircraft has multiple GNSS antennas to receive GNSS signals, GNSS interferometry can provide calculated values for the attitude and heading of the aircraft. GNSS errors contribute directly to the sources of errors for attitude and heading. In some implementations of such an example, the GNSS receiver can compute a snapshot least squares solution using only the multiple GNSS measurements. In other implementations, a hybrid solution can be calculated by processing the GNSS-derived attitude and heading solutions as measurements to the filter. In such implementations, the above solution separation and Kalman filter techniques are applicable to multiple antennas and sets of data in determining the errors in the estimates of attitude and heading.

Although the solution separation technique discussed above refers to the GNSS system; and the same technique can be carried over to the multiple sets of IMU data. For example, there may be multiple sets of instruments such as IMUs (inertial measurement units) mounted to an aircraft and a solution separation technique can be performed on the set of IMUs first, before being combined with the data from the GPS.

Although these definitions are invoked, the terminology in the claims for words such as "heading" are not limited to the aeronautical usage. Further, the same laws of physics have thus far been demonstrated to apply to all reference frames so that the different frames are equivalent and merely a transformation from one to another. Consequently, a spatial and time transformation of a "heading" direction may be additional embodiments of the systems described above.

The orientation and directions stated and illustrated in this application should not be taken as limiting. For example, the directions, e.g. "top," are merely illustrative and do not orient the embodiments absolutely. That is, a structure formed on its "side" or "bottom" is merely an arbitrary orientation in space that has no absolute direction. Also, in actual usage, for example, an aircraft may well be on its "side" because vehicles travel and turn in all directions; and then, "top" is pointing to the "side." Thus, the stated directions in this application are arbitrary designations.

EXAMPLE EMBODIMENTS

Example 1 includes a method for providing integrity for a hybrid navigation system using a Kalman filter, the method comprising: receiving signals from a plurality of global navigation satellite system (GNSS) satellites at a vehicle; obtaining inertial measurements from one or more inertial sensors on the vehicle; determining a main navigation solution for one or more of roll, pitch, platform heading, or true heading for the vehicle using data from the signals from a plurality of GNSS satellites and the inertial measurements; using solution separation to determine a plurality of sub-solutions for the main navigation solution; determining a separation between the main navigation solution and each of the sub-solutions; determining a discriminator for each of the separations; if a discriminator is greater than the threshold determining which of the GNSS satellites is at fault and excluding the GNSS satellite at fault; determining a separation variance between the main navigation solution and each of the sub-solutions; determining a threshold for detection of a satellite failure based on the separation variances and an allowable false alert rate; and determining a protection limit that bounds error in the main navigation solution based on the threshold and an allowable missed detection probability.

Example 2 includes the method of Example 1 wherein determining a protection limit includes: determining a plurality of limits, one for each sub-solution, by multiplying an estimation error variance for the sub-solution by a multiplier set based on an allowable missed detection probability; and selecting a limit of the plurality of limits having the largest value as the protection limit.

Example 3 includes the method of Example 2, wherein the estimation error variance for each sub-solution is calculated by multiplying together a transpose of an error mapping vector for roll, pitch, platform heading, or true heading, an error covariance matrix for the sub-solution, and the error mapping vector.

Example 4 includes the method of Example 3, wherein when the error mapping vector is for true heading, the error mapping vector is a sum of an error mapping vector for platform heading and an error mapping vector for wander angle.

Example 5 includes the method of Example 4, wherein the error mapping vector for platform heading relates error states of the Kalman filter to azimuth error in a body-to-local-level transformation and the error mapping vector for wander angle relates error states of the Kalman filter to azimuth error in a local-level-to-earth transformation.

Example 6 includes the method of Example 5, wherein calculating the separation variance for a sub-solution includes multiplying together a transpose of the error mapping vector, a separation between the main navigation solution and the sub-solution, and the error mapping vector for true heading.

Example 7 includes the method of any of Examples 1-6, wherein using solution separation includes maintaining the main navigation solution incorporating measurements from n GNSS satellites and the plurality of sub-solutions, each sub-solution incorporating measurements from n−1 of the plurality of GNSS satellites.

Example 8 includes a navigation system for a vehicle comprising: one or more processing devices; a global navigation satellite system (GNSS) receiver coupled to the one or more processors; one or more inertial measurement units (IMUs) coupled to the one or more processors; and one or more memory devices coupled to the one or more processing devices and including instructions which, when executed by the one or more processing devices, cause the one or more processing devices to: determine a main navigation solution for one or more of roll, pitch, platform heading, or true heading for the vehicle using data from the GNSS receiver and the IMUs; use solution separation to determine a plurality of sub-solutions for the main navigation solution; determine a separation between the main navigation solution and each of the sub-solutions; determine a discriminator for each of the separations; if a discriminator is greater than the threshold determining which of the GNSS satellites is at fault and excluding the GNSS satellite at fault; determine a separation variance between the main navigation solution and each of the sub-solutions; determine a threshold for detection of a satellite failure based on the separation variances and an allowable false alert rate; and determine a protection limit that bounds error in the main navigation solution based on the threshold and an allowable missed detection probability.

Example 9 includes the system of Example 8, wherein determine a protection limit includes: determine a plurality of limits, one for each sub-solution, by multiplying an estimation error variance for the sub-solution by a multiplier set based on an allowable missed detection probability; and select a limit of the plurality of limits having the largest value as the protection limit.

Example 10 includes the system of Example 9, wherein the instructions cause the one or more processing devices to: calculate the estimation error variance for each sub-solution by multiplying together a transpose of an error mapping vector for roll, pitch, platform heading, or true heading, an error covariance matrix for the sub-solution, and the error mapping vector.

Example 11 includes the system of Example 10, wherein when the error mapping vector is for true heading, the error mapping vector is a sum of an error mapping vector for platform heading and an error mapping vector for wander angle.

Example 12 includes the system of Example 11, wherein the error mapping vector for platform heading relates error states of the Kalman filter to azimuth error in a body-to-local-level transformation and the error mapping vector for wander angle relates error states of the Kalman filter to azimuth error in a local-level-to-earth transformation.

Example 13 includes the system of Example 12, wherein the instructions cause the one or more processing devices to: calculate the separation variance for a sub-solution by multiplying together a transpose of the error mapping vector, a separation between the main navigation solution and the sub-solution, and the error mapping vector for true heading.

Example 14 includes the system of any of Examples 8-13, wherein use solution separation includes maintaining the main navigation solution incorporating measurements from n GNSS satellites and the plurality of sub-solutions, each sub-solution incorporating measurements from n−1 of the plurality of GNSS satellites.

Example 15 includes a computer readable medium including instructions which, when executed by a processing device, cause the processing device to: determine a main navigation solution for one or more of roll, pitch, platform heading, or true heading for the vehicle using data from a GNSS receiver and one or more inertial measurement units (IMUs); use solution separation to determine a plurality of sub-solutions for the main navigation solution; determine a separation between the main navigation solution and each of the sub-solutions; determine a discriminator for each of the separations; if a discriminator is greater than the threshold determining which of the GNSS satellites is at fault and excluding the GNSS satellite at fault; determine a separation variance between the main navigation solution and each of the sub-solutions; determine a threshold for detection of a satellite failure based on the separation variances and an allowable false alert rate; and determine a protection limit that bounds error in the main navigation solution based on the threshold and an allowable missed detection probability.

Example 16 includes the computer readable medium of Example 15, wherein determine a protection limit includes: determine a plurality of limits, one for each sub-solution, by multiplying an estimation error variance for the sub-solution by a multiplier set based on an allowable missed detection probability; and select a limit of the plurality of limits having the largest value as the protection limit.

Example 17 includes the computer readable medium of Example 16, wherein the instructions cause the one or more processing devices to: calculate the estimation error variance for each sub-solution by multiplying together a transpose of an error mapping vector for roll, pitch, platform heading, or true heading, an error covariance matrix for the sub-solution, and the error mapping vector.

Example 18 includes the computer readable medium of Example 17, wherein when the error mapping vector is for true heading, the error mapping vector is a sum of an error mapping vector for platform heading and an error mapping vector for wander angle.

Example 19 includes the computer readable medium of Example 18, wherein the error mapping vector for platform heading relates error states of the Kalman filter to azimuth error in a body-to-local-level transformation and the error mapping vector for wander angle relates error states of the Kalman filter to azimuth error in a local-level-to-earth transformation.

Example 20 includes the computer readable medium of Example 19, wherein the instructions cause the one or more processing devices to: calculate the separation variance for a sub-solution by multiplying together a transpose of the error mapping vector, a separation between the main navigation solution and the sub-solution, and the error mapping vector for true heading.

What is claimed is:
1. A method for providing integrity for a hybrid navigation system using a Kalman filter, the method comprising:
receiving signals from a plurality of global navigation satellite system (GNSS) satellites at a vehicle;

obtaining inertial measurements from one or more inertial sensors on the vehicle;

determining a main navigation solution for one or more of roll, pitch, platform heading, and true heading for the vehicle using data from the signals from a plurality of GNSS satellites and the inertial measurements;

determining a plurality of sub-solutions for the main navigation solution using solution separation;

determining a separation between the main navigation solution and each of the sub-solutions;

determining a separation variance between the main navigation solution and each of the sub-solutions;

determining a threshold for detection of a satellite failure based on the separation variances and an allowable false alert rate; and determining a protection limit that bounds error in the main navigation solution based on the threshold and an allowable missed detection probability, wherein determining a protection limit comprises:

determining a plurality of limits, one or more for each sub-solution and one or more for the main navigation solution, by calculating an estimation error variance for the respective sub-solution and main navigation solution and using a multiplier set based on the allowable missed detection probability, wherein the estimation error variance for each sub-solution and the main navigation solution is calculated using a transpose of an error mapping vector for the one or more of roll, pitch, platform heading, and true heading, a respective error covariance matrix, and the respective error mapping vector; and selecting a limit from the plurality of limits as the protection limit.

2. The method of claim 1, wherein if the error mapping vector is for true heading, the error mapping vector is a sum of an error mapping vector for platform heading and an error mapping vector for wander angle.

3. The method of claim 2, wherein the error mapping vector for platform heading relates error states of the Kalman filter to azimuth error in a body-to-local-level transformation and the error mapping vector for wander angle relates error states of the Kalman filter to azimuth error in a local-level-to-earth transformation.

4. The method of claim 3, wherein calculating the separation variance for a sub-solution includes multiplying together a transpose of the error mapping vector, a separation between the main navigation solution and the sub-solution, and the error mapping vector for true heading.

5. The method of claim 1, wherein using solution separation includes maintaining the main navigation solution incorporating measurements from n GNSS satellites and the plurality of sub-solutions, each sub-solution incorporating measurements from n−1 of the plurality of GNSS satellites.

6. A navigation system for a vehicle comprising:

one or more processing devices;

a global navigation satellite system (GNSS) receiver coupled to the one or more processors;

one or more inertial measurement units (IMUs) coupled to the one or more processors; and one or more memory devices coupled to the one or more processing devices and including instructions which, when executed by the one or more processing devices, cause the one or more processing devices to:

determine a main navigation solution for one or more of roll, pitch, platform heading, and true heading for the vehicle using data from the GNSS receiver and the IMUs;

determine a plurality of sub-solutions for the main navigation solution using solution separation;

determine a separation between the main navigation solution and each of the sub-solutions;

determine a separation variance between the main navigation solution and each of the sub-solutions;

determine a threshold for detection of a satellite failure based on the separation variances and an allowable false alert rate; and determine a protection limit that bounds error in the main navigation solution based on the threshold and an allowable missed detection probability, wherein determine a protection limit comprises:

determine a plurality of limits, one or more for each sub-solution and one or more for the main navigation solution, by calculating an estimation error variance for the respective sub-solution and main navigation solution and using a multiplier set based on the allowable missed detection probability, wherein the estimation error variance for each sub-solution and the main navigation solution is calculated using a transpose of an error mapping vector for the one or more of roll, pitch, platform heading, and true heading, a respective error covariance matrix, and the respective error mapping vector; and select a limit from the plurality of limits as the protection limit.

7. The system of claim 6, wherein if the error mapping vector is for true heading, the error mapping vector is a sum of an error mapping vector for platform heading and an error mapping vector for wander angle.

8. The system of claim 7, wherein the error mapping vector for platform heading relates error states of the Kalman filter to azimuth error in a body-to-local-level transformation and the error mapping vector for wander angle relates error states of the Kalman filter to azimuth error in a local-level-to-earth transformation.

9. The system of claim 8, wherein the instructions cause the one or more processing devices to:

calculate the separation variance for a sub-solution by multiplying together a transpose of the error mapping vector, a separation between the main navigation solution and the sub-solution, and the error mapping vector for true heading.

10. The system of claim 6, wherein use solution separation includes maintaining the main navigation solution incorporating measurements from n GNSS satellites and the plurality of sub-solutions, each sub-solution incorporating measurements from n−1 of the plurality of GNSS satellites.

11. A non-transitory computer readable medium including instructions which, when executed by a processing device, cause the processing device to:

determine a main navigation solution for one or more of roll, pitch, platform heading, and true heading for the vehicle using data from a GNSS receiver and one or more inertial measurement units (IMUs);

determine a plurality of sub-solutions for the main navigation solution using solution separation;

determine a separation between the main navigation solution and each of the sub-solutions;

determine a separation variance between the main navigation solution and each of the sub-solutions;

determine a threshold for detection of a satellite failure based on the separation variances and an allowable false alert rate; and determine a protection limit that bounds error in the main navigation solution based on the threshold and an allowable missed detection probability, wherein determine a protection limit comprises:
  determine a plurality of limits, one or more for each sub-solution and one or more for the main navigation solution, by calculating an estimation error variance for the respective sub-solution and main navigation solution and using a multiplier set based on the allowable missed detection probability, wherein the estimation error variance for each sub-solution and the main navigation solution is calculated using a transpose of an error mapping vector for the one or more of roll, pitch, platform heading, and true heading, a respective error covariance matrix, and the respective error mapping vector; and
  select a limit from the plurality of limits as the protection limit.

12. The computer readable medium of claim 11, wherein if the error mapping vector is for true heading, the error mapping vector is a sum of an error mapping vector for platform heading and an error mapping vector for wander angle.

13. The computer readable medium of claim 12, wherein the error mapping vector for platform heading relates error states of the Kalman filter to azimuth error in a body-to-local-level transformation and the error mapping vector for wander angle relates error states of the Kalman filter to azimuth error in a local-level-to-earth transformation.

14. The computer readable medium of claim 13, wherein the instructions cause the one or more processing devices to:
  calculate the separation variance for a sub-solution by multiplying together a transpose of the error mapping vector, a separation between the main navigation solution and the sub-solution, and the error mapping vector for true heading.

* * * * *